United States Patent
Hatakeyama et al.

(10) Patent No.: US 10,396,352 B2
(45) Date of Patent: Aug. 27, 2019

(54) NON-AQUEOUS ELECTROLYTE BATTERY, METHOD FOR MANUFACTURING SAME, AND NON-AQUEOUS ELECTROLYTE BATTERY SYSTEM

(71) Applicant: HITACHI MAXELL, LTD., Ibaraki-shi, Osaka (JP)

(72) Inventors: Atsushi Hatakeyama, Osaka (JP); Yasunori Masaoka, Osaka (JP); Yoshihisa Hirose, Osaka (JP)

(73) Assignee: Maxell Holdings, Ltd., Kyoto (JP)

( * ) Notice: Subject to any disclaimer, the term of this patent is extended or adjusted under 35 U.S.C. 154(b) by 113 days.

(21) Appl. No.: 15/509,395

(22) PCT Filed: Sep. 8, 2015

(86) PCT No.: PCT/JP2015/075429
§ 371 (c)(1),
(2) Date: Mar. 7, 2017

(87) PCT Pub. No.: WO2016/039323
PCT Pub. Date: Mar. 17, 2016

(65) Prior Publication Data
US 2017/0263926 A1    Sep. 14, 2017

(30) Foreign Application Priority Data

Sep. 8, 2014 (JP) .................................. 2014-181978
Nov. 4, 2014 (JP) .................................. 2014-223908
(Continued)

(51) Int. Cl.
*H01M 4/36* (2006.01)
*H01M 10/05* (2010.01)
(Continued)

(52) U.S. Cl.
CPC ........... *H01M 4/366* (2013.01); *H01M 4/134* (2013.01); *H01M 4/1395* (2013.01);
(Continued)

(58) Field of Classification Search
None
See application file for complete search history.

(56) References Cited

U.S. PATENT DOCUMENTS 4,446,212 A * 5/1984 Kaun .................... H01M 4/13
429/103
6,808,845 B1 10/2004 Nonaka et al.
(Continued)

FOREIGN PATENT DOCUMENTS

JP          3-108260 A     5/1991
JP          6-70159 U      9/1994
(Continued)

OTHER PUBLICATIONS

JP-10106628-A English machine translation (Year: 1998).*
(Continued)

*Primary Examiner* — Scott J. Chmielecki
(74) *Attorney, Agent, or Firm* — Westerman, Hattori, Daniels & Adrian, LLP

(57) ABSTRACT

Provided are a non-aqueous electrolyte battery and a non-aqueous electrolyte battery system that can be repeatedly charged and that have good storage characteristics in a high-temperature environment. A non-aqueous electrolyte battery of the present invention includes an electrode body in which a positive electrode and a negative electrode are laminated with a separator interposed therebetween, and a non-aqueous electrolyte. The negative electrode has a laminated body including a metal base layer that does not form an alloy with Li, and Al active layers respectively bonded to both faces of the metal base layer, or a laminated body
(Continued)

including a metal base layer that is made of a metal selected from Ni, Ti, and Fe, or an alloy thereof, and an Al active layer bonded to the metal base layer. A Li—Al alloy is formed at least on a surface side of each Al active layer.

11 Claims, 3 Drawing Sheets

(30) Foreign Application Priority Data

Mar. 16, 2015 (JP) .................................. 2015-051559
Apr. 28, 2015 (JP) .................................. 2015-091356

(51) Int. Cl.
  *H01M 4/134* (2010.01)
  *H01M 10/052* (2010.01)
  *H01M 4/485* (2010.01)
  *H01M 4/66* (2006.01)
  *H01M 10/0525* (2010.01)
  *H01M 4/1395* (2010.01)
  *H01M 4/38* (2006.01)
  *H01M 4/48* (2010.01)

(52) U.S. Cl.
  CPC ........... *H01M 4/382* (2013.01); *H01M 4/485* (2013.01); *H01M 4/661* (2013.01); *H01M 4/667* (2013.01); *H01M 10/052* (2013.01); *H01M 10/0525* (2013.01); *H01M 4/48* (2013.01); *H01M 2220/20* (2013.01); *Y02T 10/7011* (2013.01)

(56) References Cited

U.S. PATENT DOCUMENTS

| | | | |
|---|---|---|---|
| 2003/0134198 A1* | 7/2003 | Sawa | .................. H01M 4/0471 429/221 |
| 2014/0004417 A1* | 1/2014 | Sano | ...................... C01B 25/45 429/211 |
| 2016/0285077 A1 | 9/2016 | Miki et al. | |

FOREIGN PATENT DOCUMENTS

| | | | |
|---|---|---|---|
| JP | 8-293302 | A | 11/1996 |
| JP | 10-106628 | A | 4/1998 |
| JP | 10106628 | A  * | 4/1998 |
| JP | 2001-110404 | A | 4/2001 |
| JP | 2005-79077 | A | 3/2005 |
| WO | 2014/080886 | A1 | 5/2014 |

OTHER PUBLICATIONS

Extended European Search Report dated Jan. 2, 2018, issued in European Patent Application No. 1584095.0 (PCT/JP2015075429).
International Search Report dated Dec. 8, 2015, issued in counterpart International Application No. PCT/JP2015/075429 (2 pages).

* cited by examiner

NON-AQUEOUS ELECTROLYTE BATTERY, METHOD FOR MANUFACTURING SAME, AND NON-AQUEOUS ELECTROLYTE BATTERY SYSTEM

TECHNICAL FIELD

The present invention relates to a non-aqueous electrolyte battery and a non-aqueous electrolyte battery system that have good storage characteristics, and a method for manufacturing the non-aqueous electrolyte battery.

BACKGROUND ART

Non-aqueous electrolyte batteries are used for various types of applications utilizing their characteristics such as high capacity and high voltage. Particularly in recent years, the demand for non-aqueous electrolyte batteries for vehicle application has increased in accordance with the implementation of electric vehicles and the like.

Non-aqueous electrolyte batteries for vehicle application are mainly applied to driving power sources of motors of electric vehicles, but other applications are also being developed. For example, emergency reporting systems for making reports to parties concerned when a vehicle accident or the like has occurred are currently being developed, and research is being conducted on the application of non-aqueous electrolyte batteries as a power source of such systems.

Such systems operate only in limited circumstances in actuality, but it is necessary that they reliably operate at the time of an emergency. Thus, batteries functioning as the power source are required to have reliability in that their characteristics can be satisfactorily maintained even after long-term storage. Accordingly, for such applications, non-aqueous electrolyte primary batteries are used that have better storage characteristics than those of non-aqueous electrolyte secondary batteries that are widely used as power sources of electronic devices, namely batteries whose capacity is unlikely to decrease even after long-term storage of several years or more.

As negative electrode active materials for the non-aqueous electrolyte primary batteries, metallic lithium or a lithium alloy such as a Li—Al (lithium-aluminum) alloy is used. Since a lithium alloy can also be used as a negative electrode active material in non-aqueous electrolyte secondary batteries, a proposal has been made to stabilize battery characteristics by forming a negative electrode using a clad material of a metal capable of absorbing and releasing lithium and a dissimilar metal incapable of absorbing and releasing lithium (Patent Document 1).

PRIOR ART DOCUMENTS

Patent Document

Patent Document 1: JP H8-293302A

DISCLOSURE OF INVENTION

Problem to be Solved by the Invention

Meanwhile, also in the above-described applications, repeatedly chargeable batteries may be required for various reasons. Even when a clad material as described above is used, it is not absolutely possible to stabilize characteristics of non-aqueous electrolyte secondary batteries.

The present invention was made in view of the above-described circumstances, and it is an object thereof to provide a non-aqueous electrolyte battery and a non-aqueous electrolyte battery system that can be repeatedly charged and that have good storage characteristics in a high-temperature environment, and a method for manufacturing the non-aqueous electrolyte battery.

Means for Solving Problem

In order to achieve the above-described object, the present invention is directed to a non-aqueous electrolyte battery including an electrode body in which a positive electrode and a negative electrode are laminated with a separator interposed therebetween, and a non-aqueous electrolyte, wherein the negative electrode has a laminated body including a metal base layer that does not form an alloy with Li, and Al active layers respectively bonded to both faces of the metal base layer, and Li—Al alloys are formed at least on surface sides of the Al active layers.

Furthermore, another aspect of the present invention is directed to a non-aqueous electrolyte battery including an electrode body in which a positive electrode and a negative electrode are laminated with a separator interposed therebetween, and a non-aqueous electrolyte, wherein the negative electrode has a laminated body including a metal base layer that does not form an alloy with Li, and an Al active layer bonded to the metal base layer, a Li—Al alloy is formed at least on a surface side of the Al active layer, and the metal base layer is made of a metal selected from Ni, Ti, and Fe, or an alloy thereof.

It is possible to manufacture the non-aqueous electrolyte battery of the present invention, by using a manufacturing method of the present invention, including: preparing a laminated metal foil in which an Al metal layer is bonded to a metal base layer that does not form an alloy with Li; and forming an Al active layer by forming a Li—Al alloy at least on a surface side of the Al metal layer.

Furthermore, the present invention is directed to a non-aqueous electrolyte battery system including: the non-aqueous electrolyte battery of the present invention; and a charging circuit, wherein a Li content when charging has ended is 15 to 48 at % when a total of Li and Al in the Al active layer is taken as 100 at %.

Effects of the Invention

According to the present invention, it is possible to provide a non-aqueous electrolyte battery and a non-aqueous electrolyte battery system that can be repeatedly charged and that have good storage characteristics in a high-temperature environment, and a method for manufacturing the non-aqueous electrolyte battery.

DESCRIPTION OF THE INVENTION

Figure 1:
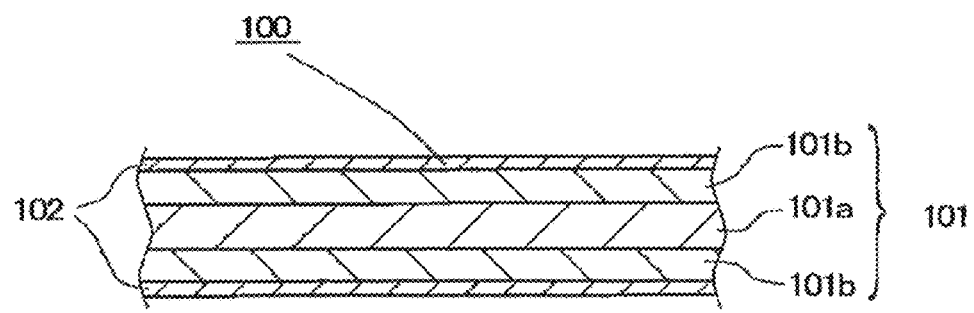
FIG. 1 is a cross-sectional view schematically showing an example of a negative electrode (negative electrode precursor) for use in a non-aqueous electrolyte battery of the present invention.

The Li (Li ion) acceptability of Li (metallic Li) and Li—Al alloy (alloy of Li and Al) is lower than that of carbon materials. If non-aqueous electrolyte secondary batteries using such a material as a negative electrode active material are repeatedly charged and discharged, the capacity is likely to decrease at an early stage. Accordingly, in non-aqueous electrolyte secondary batteries that are assumed to be used with repeated charging and discharging, carbon materials such as graphite are widely used as a negative electrode active material.

Meanwhile, self-discharge is likely to occur in non-aqueous electrolyte secondary batteries using a carbon material as a negative electrode active material, and thus, if they are stored in a charged state, the capacity is likely to decrease.

Accordingly, non-aqueous electrolyte primary batteries that have better storage characteristics than those of non-aqueous electrolyte secondary batteries and whose capacity is unlikely to decrease even after long-term storage of several years or more are used as power source batteries for apparatuses such as vehicle emergency reporting systems that actually operate only in limited circumstances but are required to reliably operate when necessary.

Meanwhile, also in these applications, there is a demand for batteries that can be charged several to several tens of times for reasons including easy maintenance, while not having to be routinely charged and discharged a large number of times as is the case with ordinary secondary batteries.

Thus, in the non-aqueous electrolyte battery of the present invention, a Li—Al alloy is used as a negative electrode active material such that the battery has high storage characteristics and a high capacity and can be charged a number of times, even in a high-temperature environment such as in a vehicle.

In order to improve the storage characteristics, the non-aqueous electrolyte battery of the present invention has any one of the following aspects. Note that, in all aspects, a current collector is used in order that the shape of a negative electrode during discharge may be kept stable such that the battery can be charged again in the future.

Aspect (1)

In a battery using a Li—Al alloy as a negative electrode active material, a Li foil (including a Li alloy foil unless otherwise specified) and an Al foil (including an Al alloy foil unless otherwise specified) are laminated and introduced into the battery, so that Li and Al react with each other in the presence of a non-aqueous electrolyte to form a Li—Al alloy. However, if a metal foil [a Cu (copper) foil, a Cu alloy foil, etc.] functioning as a current collector is further laminated on the laminated body of the Li foil and the Al foil and inserted into the battery the internal resistance of the battery increases after storage (after storage in particular in a high-temperature environment), and the storage characteristics are not sufficiently improved.

The inventors of the invention conducted research and found that the reason for this is that the volume changes when the laminated body of the Li foil and the Al foil forms a Li—Al alloy in the battery, or the volume changes when a Li—Al alloy is formed in the form of a fine powder and the negative electrode readily absorbs the non-aqueous electrolyte, and thus the close contact between Li—Al alloy layer (Al foil) and the current collector cannot be ensured.

The inventors of the invention further conducted research and found that, with methods such as a method including: preparing an Al metal layer (Al foil, etc.) for forming a Li—Al alloy, and a metal base layer (Cu foil, etc.) that does not form an alloy with Li functioning as a current collector in a state of being bonded to each other in advance; and laminating a Li layer (Li foil, etc.) on a surface of the metal layer, thereby allowing Li of the Li layer and Al of the Al metal layer to react with each other, and a method including: assembling a battery using, as it is, a bonded body of the Al metal layer and the metal base layer; and charging the battery after the assembly, thereby allowing Al of the Al metal layer and Li ions in a non-aqueous electrolyte to electrochemically react with each other, a Li—Al alloy is formed at least on a surface side of the Al metal layer, and a negative electrode is obtained in which an Al active layer is bonded to that surface of the metal base layer, and thus an increase in the internal resistance during storage can be suppressed.

As a result of further research, it was found that, in the case where Al metal layers are bonded to both faces of the metal base layer, and Li—Al alloys are formed at least on a surface side of each Al metal layer, deformation (warping, etc.) of the negative electrode and deterioration in the battery characteristics associated therewith can be more reliably suppressed compared with the case where an Al metal layer is bonded to and a Li—Al alloy is formed on only one face of the metal base layer, and thus the aspect (1) of a non-aqueous electrolyte battery that can be repeatedly charged and discharged and that has good storage characteristics in a high-temperature environment was achieved based on these findings.

Aspect (2)

In researching aspect (1), it was found that, in the case where the metal base layer is made of a metal selected from Ni, Ti, and Fe, or an alloy thereof, the effect of suppressing deformation of the negative electrode due to a change in the volume when a Li—Al alloy is formed increases, and thus deterioration in the battery characteristics can be sufficiently suppressed not only when an Al metal layer is bonded to both faces of the metal base layer but also when an Al metal layer is bonded to and a Li—Al alloy is formed on only one face of the metal base layer, and thus the aspect (2) of a non-aqueous electrolyte battery was achieved.

In batteries using a Li—Al alloy as a negative electrode active material as in the aspects (1) and (2), the discharge capacity depends on the Li amount, and thus it is supposedly desirable to increase the Li content ratio in order to increase the capacity of the battery. However, it was found in research conducted by the inventors of the invention that an increase in the Li ratio leads to deterioration in the storage characteristics of the battery. The reason for this seems to be that the crystal structure of a Li—Al alloy changes in accordance with the ratio between Li and Al that are introduced into the battery for forming the Li—Al alloy. Hence a large Li amount may lead to high reactivity with an electrolyte or the battery potential becoming unstable during storage.

Thus, in the non-aqueous electrolyte battery system of the present invention, not only is repeated charging enabled as described above, but also the ratio between Li and Al in a negative electrode of a battery in a charged state is specified, so that excellent storage characteristics can be ensured and, moreover, a large capacity and excellent high-current discharge characteristics can be ensured.

In formation of a negative electrode according to the non-aqueous electrolyte battery of the present invention, as a first method for example, a laminated body is used that is formed by bonding a metal base layer that does not form an alloy with Li (hereinafter simply referred to as a "base layer") and an Al metal layer (hereinafter, simply referred to as an "Al layer") to each other to form a laminated metal foil, and laminating a Li foil on a surface of the Al layer to form a Li layer.

The base layer may be made of a metal such as Cu, Ni, Ti, or Fe, or an alloy thereof with another element (note that the alloy is an alloy that does not react with Li, such as stainless steel). In order to sufficiently suppress expansion of the negative electrode during charging even when the thickness of the base layer is reduced, the base layer may be made of a material having a high tensile strength, such as a metal selected from nickel, titanium, and iron, or an alloy thereof, and is preferably made of a material having a tensile strength at room temperature of 400 N/mm$^2$ or more.

That is to say, in the case of coin batteries having a relatively small electrode area, even when the base is made of a material having a low tensile strength such as Cu (tensile strength: 220 N/mm$^2$), the influence of expansion of the negative electrode is small, and thus a battery having predetermined characteristics can be formed, for example, by resistance-welding a base layer to a sealing plate. On the other hand, if the electrode area increases or if a plurality of negative electrodes are laminated, deterioration in the characteristics due to expansion of the negative electrode increases. However, if the base layer is made of a metal selected from Ni, Ti, and Fe, or an alloy thereof, such as Ni (490 N/mm$^2$), Ti (410 N/mm$^2$), or SUS304 (600 N/mm$^2$), an excellent expansion suppression effect can be obtained even when the thickness is small. The effect realized by the above-described material is more significant particularly when the Al active layer has an area (a total area, if there are a plurality of areas) of 10 cm$^2$ or more. Note that, in the aspect (2) of the non-aqueous electrolyte battery, the base layer is made of a metal selected from Ni, Ti, and Fe, or an alloy thereof.

Meanwhile, in order to reduce impedance of the negative electrode, the base layer may be made of a material having a low volume resistivity at room temperature, and is preferably made of a material having a volume resistivity of $80 \times 10^{-6}$ Ω·cm or less, more preferably a material having a volume resistivity of $30 \times 10^{-6}$ Ω·cm or less, and particularly preferably a material having a volume resistivity of $15 \times 10^{-6}$ Ω·cm or less.

Since Ni has a volume resistivity of $6.8 \times 10^{-6}$ Ω·cm, Ti has a volume resistivity of $55 \times 10^{-6}$ Ω·cm, and SUS304 has a volume resistivity of $72 \times 10^{-6}$ Ω·cm, the base layer is particularly preferably made of Ni or an alloy thereof in view of the volume resistivity.

Specifically, the base layer is made of a foil, a vapor deposited film, a plated film, or the like of the above-described materials or an alloy thereof.

The Al layer may be made of pure Al, or an Al alloy having an additional element for improving the strength or the like, and is specifically made of a foil, a vapor deposited film, a plated film or the like of these.

The Li layer may be formed, for example, by laminating a Li foil on a surface of the Al layer, or by forming a vapor deposited film.

FIG. 1 is a cross-sectional view schematically showing an example of a laminated body (negative electrode precursor) for forming a negative electrode for use in a non-aqueous electrolyte battery of the present invention. A negative electrode precursor 100 in FIG. 1 is a laminated body obtained by respectively bonding Al layers 101$b$ to both faces of a base layer 101$a$ to form a laminated metal foil 101, and respectively laminating Li foils 102 on the surfaces of the Al layers 101$b$.

In a non-aqueous electrolyte battery using the negative electrode precursor as a negative electrode, Li in a Li foil and Al in an Al layer react with each other in the presence of a non-aqueous electrolyte to form a Li—Al alloy on a surface, of the Al layer, on the side (separator side) where the Li foil is laminated, and thus the Al layer is changed into an Al active layer. That is to say, a Li—Al alloy formed in the non-aqueous electrolyte battery is present at least on a surface side (Li foil side) of the Al active layer of the negative electrode.

In the negative electrode precursor, in the laminated metal foil formed by bonding a base layer and an Al layer to each other, an Al layer may be bonded to one face of the base layer, or an Al layer may be bonded to both faces of the base layer as shown in FIG. 1. Note that, in the negative electrode precursor that is used in the aspect (1) of the non-aqueous electrolyte battery, Al layers are respectively bonded to both faces of the base layer as shown in FIG. 1 in the laminated metal foil formed by bonding the base layer and the Al layers to each other.

In a laminated body formed by laminating Li foils on the laminated metal foil formed by bonding the base layer and the Al layers to each other, the Li foils are laminated on surfaces (faces not bonded to the base layer) of the Al layers on both sides of the base layer.

Below, cases will be described in which the base layer is made of Cu (Cu foil) and in which the base layer is made of Ni (Ni foil) as examples, but the same applies to cases where the base layer is made of a material other than Cu or Ni.

Examples of the laminated metal foil formed by bonding the Cu layer and the Al layer include a clad material of a Cu foil and an Al foil, a laminated film obtained by forming an Al layer on a Cu foil through Al vapor deposition, and the like.

Examples of the Cu layer according to the laminated metal foil formed by bonding the Cu layer and the Al layer include a layer constituted by Cu (and incidental impurities), a layer constituted by a Cu alloy containing Zr, Cr, Zn, Ni, Si, P, and the like as alloy components, where the remaining part is constituted by Cu and incidental impurities (the content of the alloy components is, for example, 10% by mass or less, and preferably 1% by mass or less, in total), and the like.

Furthermore, examples of the laminated metal foil formed by bonding the Ni layer and the Al layer include a clad material of a Ni foil and an Al foil, a laminated film obtained by forming an Al layer on a Ni foil through Al vapor deposition, and the like.

Examples of the Ni layer according to the laminated metal foil formed by bonding the Ni layer and the Al layer include a layer constituted by Ni (and incidental impurities), a layer constituted by a Ni alloy containing Zr, Cr, Zn, Cu, Fe, Si, P, and the like as alloy components, where the remaining part is constituted by Ni and incidental impurities (the content of the alloy components is, for example, 20% by mass or less in total), and the like.

Moreover, examples of the Al layer according to the laminated metal foil formed by bonding the Cu layer and the Al layer and the laminated metal foil formed by bonding the Ni layer and the Al layer include a layer constituted by Al (and incidental impurities), a layer constituted by an Al alloy containing Fe, Ni, Co, Mn, Cr, V, Ti, Zr, Nb, Mo, and the like as alloy components, where the remaining part is constituted by Al and incidental impurities (the content of the alloy components is, for example, 50% by mass or less in total), and the like.

In the laminated metal foil formed by bonding the Cu layer and the Al layer and the laminated metal foil formed by bonding the Ni layer and the Al layer, in order to make the ratio of the Li—Al alloy functioning as the negative electrode active material to be of a certain ratio or higher, the thickness of the Al layer (note that the thickness is the thickness for one face if Al layers are respectively bonded to both faces of the Cu layer or the Ni layer forming the base layer, the same applies to the following) is preferably 10 or more, more preferably 20 or more, even more preferably 50 or more, and particularly preferably 70 or more, when the thickness of the Cu layer or the Ni layer forming the base layer is taken as 100. Furthermore, in order to improve the current collecting effect and to sufficiently hold a Li—Al alloy, in the laminated metal foil formed by bonding the Cu layer and the Al layer, and the laminated metal foil formed by bonding the Ni layer and the Al layer, the thickness of the Al layer is preferably 500 or less, more preferably 400 or less, particularly preferably 300 or less, and most preferably 200 or less, when the thickness of the Cu layer or the Ni layer forming the base layer is taken as 100.

The thickness of the Cu layer or the Ni layer forming the base layer is preferably 10 to 50 μm, and more preferably 40 μm or less. Furthermore, the thickness of the Al layer (note that the thickness is the thickness for one face if Al layers are respectively bonded to both faces of the Cu layer or the Ni layer forming the base layer) is preferably 10 μm or more, more preferably 20 μm or more, and particularly preferably 30 μm or more, and is preferably 150 μm or less, more preferably 70 μm or less, and particularly preferably 50 μm or less.

The thickness of the laminated metal foil formed by bonding the Cu layer and the Al layer and the laminated metal foil formed by bonding the Ni layer and the Al layer is preferably 50 μm or more, and more preferably 60 μm or more, in order to make the capacity of the negative electrode be at a certain level or higher, and is preferably 300 μm or less, more preferably 200 μm or less, and particularly preferably 150 μm or less, in order to set the capacity ratio to be in a proper range with respect to the positive electrode active material.

Examples of the Li foil that is used in the negative electrode precursor include a foil made of Li (and incidental impurities), a foil made of a Li alloy containing Fe, Ni, Co, Mn, Cr, V, Ti, Zr, Nb, Mo, and the like as alloy components in an amount of 40% by mass or less in total, where the remaining part is constituted by Li and incidental impurities, and the like.

Instead of the method in which the laminated body formed by laminating the Li foil on a surface of the laminated metal foil is used as a negative electrode precursor and forms an Al active layer of a negative electrode, as a second method, a method in which the laminated metal foil is used as is as a negative electrode precursor to assemble a battery, and the battery is charged after assembly is also used to form an Al active layer forming a negative electrode.

That is to say, if Al at least on a surface side of the Al metal layer of the laminated metal foil is allowed to electrochemically react with Li ions in the non-aqueous electrolyte through the battery being charged, an Al active layer can be obtained in which a Li—Al alloy is formed at least on a surface side thereof.

According to the second method using, as a negative electrode precursor, the laminated metal foil on which no Li foil is laminated, it is possible to simplify the steps of manufacturing the battery. However, if the negative electrode precursor is used to form an Al active layer, the irreversible capacity of the Li—Al alloy is offset by the Li of the Li layer of the negative electrode precursor, and thus it is preferable to form a negative electrode (form an Al active layer of the negative electrode) using the first method in order to realize a high capacity, and, furthermore, it is also possible to form a negative electrode (form an Al active layer of the negative electrode), by assembling a battery using the negative electrode precursor according to the first method, and charging the battery.

In a battery having, as a negative electrode, a laminated body containing a metal base layer that does not form an alloy with Li, and an Al active layer bonded to the metal base layer, as the non-aqueous electrolyte battery of the present invention, in order to satisfactorily maintain the crystal structure of a material functioning as the negative electrode active material to stabilize the potential of the negative electrode, and to ensure superior storage characteristics, it is preferable to use the battery in a range where the Li content is 48 at % or less when the total of Li and Al in the Al active layer of the negative electrode is taken as 100 at %, either method, of the first and second methods, is used to form an Al active layer of the negative electrode. That is to say, when the battery is being charged, the charge is ended preferably in a range where the Li content in the Al active layer is not more than 48 at %, more preferably in a range where the Li content is 40 at % or less, and particularly preferably in a range where the Li content is 35 at % or less.

The entire Al layer of the laminated metal foil may form an alloy with Li and function as an active material, but it is more preferable that the base layer side of the Al layer does not form an alloy with Li, so that the Al active layer has a layered structure consisting of a Li—Al alloy layer on the surface side and an Al layer remaining on the base side.

That is to say, it seems that, if charging is ended in the above-described state, the separator side (positive electrode side) of the Al layer is allowed to react with Li to form a Li—Al alloy (mixture phase of the α phase and the β phase, or the β phase), whereas the Al layer, at a portion thereof near the portion bonded to the base layer, is not allowed to substantially react with Li, thereby remaining as the original Al layer as is or having a Li content lower than that on the separator side, and thus excellent close contact between the original Al layer and the base layer can be maintained, and the Li—Al alloy formed on the separator side can be easily held on the base layer. It is more preferable that the charge is ended particularly in a state where the α phase is mixed in the Li—Al alloy formed on the separator side of the Al layer.

Note that, in this specification, "Al that substantially does not form an alloy with Li" refers to not only a state in which the Al layer does not contain Li but also a state of the α phase where several at % or less of Li is dissolved, and "not allowed to substantially react with Li" refers to not only a state in which several at % or less of Li is dissolved but also a state in which Al is maintained in the original α phase.

Furthermore, in the non-aqueous electrolyte battery of the present invention, in order to improve the capacity and the high-current discharge characteristics, the battery is charged preferably to a range where the Li content is 15 at % or more, and more preferably to a range where the Li content is 20 at % or more, when the total of Li and Al is taken as 100 at %.

Furthermore, in the negative electrode according to the non-aqueous electrolyte battery of the present invention, discharging is ended in a state where both the Al metal phase (α phase) and the Li—Al alloy phase (β phase) are present. Accordingly, a change in the volume of the negative electrode during charge and discharge is suppressed, and thus deterioration in the capacity in charge/discharge cycles can be suppressed. In order to allow the β phase of the Li—Al alloy to remain in the negative electrode, at the end of discharge, the Li content may be approximately 3 at % or more, and is preferably 5 at % or more, when the total of Li and Al in the negative electrode is taken as 100 at %. Meanwhile, in order to increase the discharge capacity, the Li content at the end of discharge is preferably 12 at % or less, and more preferably 10 at % or less.

In order to facilitate the battery being used as described above, in the negative electrode precursor that is used when forming a negative electrode using the first method in the non-aqueous electrolyte battery of the present invention, when assembling the battery, the thickness of the Li layer that is laminated on the Al layer is preferably 10 or more, more preferably 20 or more, and even more preferably 30 or more, and is preferably 80 or less, and more preferably 70 or less, when the thickness of the Al layer is taken as 100.

Specifically the thickness of the Li foil (note that the thickness is the thickness for one face if Li foils are provided on both faces of the laminated body) is preferably 10 μm or more, more preferably 20 μm or more, and even more preferably 30 μm or more, and is preferably 80 μm or less, and more preferably 70 μm or less.

The Li foil and the Al layer (an Al foil for foraging the Al layer, or an Al layer according to a foil formed by bonding a metal layer forming a negative electrode current collector and an Al layer) are bonded to each other using a common method such as pressure-bonding.

The laminated body that is used as the negative electrode precursor when forming a negative electrode using the first method can be manufactured by laminating a Li foil on a surface of an Al layer of a foil in which a Cu layer and the Al layer are bonded to each other or a foil in which a Ni layer and the Al layer are bonded to each other.

The Cu layer or the Ni layer in the laminated body, which is used as the negative electrode precursor in the first and second methods for forming a negative electrode, may be provided with a negative electrode lead using a common method.

The positive electrode according to the non-aqueous electrolyte battery of the present invention may have a structure, for example, in which a positive electrode material mixture layer containing a positive electrode active material, a conduction supporting agent, a binder, and the like is provided on one or both faces of a current collector. As the positive electrode active material, a lithium-containing composite oxide (lithium-containing composite oxide that can absorb and release Li ions), and positive electrode active materials other than the lithium-containing composite oxide may be used. Note that, when forming a negative electrode using the second method, a compound that can release lithium, such as a lithium-containing composite oxide, is used as the positive electrode active material.

Examples of the lithium-containing composite oxide that is used as the positive electrode active material include lithium-containing composite oxides having a layered structure represented by $Li_{1+x}M^1O_2$ ($-0.1<x<0.1$, $M^1$: Co, Ni, Mn, Al, Mg, etc.), lithium-manganese oxides having a spinel structure in which $LiMn_2O_4$ or partial elements thereof are substituted with other elements, olivine-type compounds represented by $LiM^2PO_4$ ($M^2$: Co, Ni, Mn, Fe, etc.), and the like. Examples of the lithium-containing composite oxides having a layered structure may include lithium cobalt oxide such as $LiCoO_2$, and $LiNi_{1-a}Co_{a-b}Al_bO_2$ ($0.1 \leq a \leq 0.3$, $0.01 \leq b \leq 0.2$), as well as oxides containing at least Co, Ni, and Mn ($LiMn_{1/3}Ni_{1/3}Co_{1/3}O_2$, $LiMn_{5/12}Ni_{5/12}Co_{1/6}O_2$, $LiNi_{3/5}Mn_{1/5}Co_{1/5}O_2$, etc.), and the like.

Furthermore, examples of the positive electrode active materials other than the lithium-containing composite oxide include metal oxides such as manganese dioxide, vanadium pentoxide, and chromium oxide, and metal sulfides such as titanium disulfide and molybdenum disulfide.

As the positive electrode active material, the compounds listed above as examples may be used alone or in a combination of two or more types, but it is preferable to use a lithium-containing composite oxide, and more preferably to use lithium cobalt oxide, due to their high capacity and excellent storage stability.

Examples of the conduction supporting agent according to the positive electrode material mixture layer include: carbon materials such as carbon blacks (e.g., acetylene black, ketjen black, channel black, furnace black, lamp black, and thermal black) and carbon fibers; conductive fibers such as metal fibers; carbon fluoride; powders of metals such as copper and nickel; organic conductive materials such as polyphenylene derivatives; and the like.

Examples of the binder according to the positive electrode material mixture layer include polyvinylidene fluoride (PVDF), polytetrafluoroethylene (PTFE), styrene butadiene rubber (SBR), carboxymethyl cellulose (CMC), polyvinylpyrrolidone (PVP), and the like.

The positive electrode can be manufactured, for example, by preparing a positive electrode material mixture-containing composition (paste, slurry etc.) in which a positive electrode material mixture containing a positive electrode active material, a conduction supporting agent, a binder, and the like is dispersed in a solvent (organic solvent such as NMP, or water), applying the positive electrode material mixture-containing composition to one or both faces of a current collector or the like and drying the positive electrode material mixture-containing composition thereon, and, if necessary, performing pressure treatment.

It is also possible to form the positive electrode, by forming a molded body using the positive electrode material mixture, and laminating part of or the entirety of one face of this molded body on a positive electrode current collector. The positive electrode material mixture molded body and the positive electrode current collector may be laminated on each other through pressure treatment or the like.

As the positive electrode current collector, a foil, a punched metal sheet, a net, an expanded metal, or the like made of a metal such as Al or an Al alloy may be used, but, typically an Al foil is preferably used. The thickness of the positive electrode current collector is preferably 10 to 30 μm.

The positive electrode material mixture layer preferably has a composition, for example, including 80.0 to 99.8% by mass of positive electrode active material, 0.1 to 10% by mass of conduction supporting agent, and 0.1 to 10% by mass of binder. Furthermore, the thickness of the positive electrode material mixture layer is preferably 50 to 300 µm for one face of the current collector.

The positive electrode current collector may be provided with a positive electrode lead using a common method.

The capacity ratio of the positive electrode that is combined with the above-described negative electrode may be set such that the Li content is 15 to 48 at % when the total of Li and Al in the negative electrode at the end of the charge is taken as 100 at %, desirably such that the β phase of the alloy remains in the negative electrode at the end of the discharge.

In the non-aqueous electrolyte battery of the present invention, a positive electrode and a negative electrode are used, for example, in the form of an electrode body in which the positive electrode and the negative electrode are laminated with a separator interposed therebetween, a wound electrode body obtained by spirally winding the electrode body, or a laminated electrode body obtained by alternately laminating a plurality of positive electrodes and a plurality of negative electrodes.

The separator preferably has properties in which holes are closed at 80° C. or higher (more preferably 100° C. or higher) and 170° C. or lower (more preferably 150° C. or lower) (i.e., shut-down function), and a separator that is used in ordinary non-aqueous electrolyte secondary batteries and the like, such as a microporous membrane made of polyolefin such as polyethylene (PE) or polypropylene (PP) may be used. The microporous membrane forming the separator may be made, for example, only of PE, or only of PP, or may be a laminated body of a PE microporous membrane and a PP microporous membrane. The thickness of the separator is preferably, for example, 10 to 30 µm.

The non-aqueous electrolyte battery of the present invention is manufactured, for example, by placing the laminated electrode body in an outer packaging, injecting a non-aqueous electrolyte into the outer packaging and immersing the electrode body in the non-aqueous electrolyte, and then sealing the opening of the outer packaging. The outer packaging may be an outer jacket made of steel, aluminum, or an aluminum alloy, or may be an outer packaging made of a laminated film obtained through metal vapor deposition, for example.

The non-aqueous electrolyte may be a solution prepared by dissolving a lithium salt in a non-aqueous solvent listed below.

Examples of the solvent include aprotic organic solvents, such as ethylene carbonate (EC), propylene carbonate (PC), butylene carbonate (BC), dimethyl carbonate (DMC), diethyl carbonate (DEC), methyl ethyl carbonate (MEC), γ-butyrolactone (γ-BL), 1,2-dimethoxyethane (DME), tetrahydrofuran (THF), 2-methyltetrahydrofuran, dimethyl sulfoxide (DMSO), 1,3-dioxolane, formamide, dimethylformamide (DMF), dioxolane, acetonitrile, nitromethane, methyl formate, methyl acetate, phosphotriester, trimethoxymethane, a dioxolane derivative, sulfolane, 3-methyl-2-oxazolidinone, a propylene carbonate derivative, a tetrahydrofuran derivative, diethyl ether, and 1,3-propanesultone, which may be used alone or in a combination of two or more types.

The lithium salt according to the non-aqueous electrolyte may be, for example, at least one selected from $LiClO_4$, $LiPF_6$, $LiBF_4$, $LiAsF_6$, $LiSbF_6$, $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3(n\geq 2)$, $LiN(RfOSO_2)_2$ [where Rf is an fluoroalkyl group], and the like. The concentration of such a lithium salt in the electrolyte is preferably 0.6 to 1.8 mol/l, and more preferably 0.9 to 1.6 mol/l.

Furthermore, in order to further improve various characteristics of the battery, additives such as vinylene carbonates, 1,3-propanesultone, diphenyl disulfide, cyclohexylbenzene, biphenyl, fluorobenzene, t-butylbenzene, and the like may be added as appropriate to these non-aqueous electrolytes.

Furthermore, the non-aqueous electrolyte may be made to take the form of a gel (gel electrolyte) using a gelling agent such as a known polymer.

Since the non-aqueous electrolyte battery of the present invention is manufactured through positive electrode capacity regulation, the time at which charging has ended can be detected by controlling the charging current capacity or charging voltage, and thus charge end conditions can be set in advance on the charging circuit side.

Thus, in a non-aqueous electrolyte battery system having the non-aqueous electrolyte battery according to any one of the above-described aspects and a charging circuit, if charge end conditions are set such that, at the end of the charge, the Li content is 15 to 48 at % when the total of Li and Al in the Al active layer is taken as 100 at %, the storage characteristics of the non-aqueous electrolyte battery can be exerted well.

EXAMPLES

Hereinafter, the present invention will be described in detail by way of examples, but the present invention is not limited thereto.

Evaluation of Non-Aqueous Electrolyte Battery

Example 1

As a negative electrode precursor, a clad material (laminated metal foil) having a size of 25 mm×40 mm was used in which Al foils each having a thickness of 30 µm were respectively laminated on both faces of a Cu foil having a thickness of 30 µm (tensile strength: 220 N/mm$^2$, volume resistivity: $2\times10^{-6}$ Ω·cm). A Cu foil for collecting a current was welded using ultrasonic waves to an end of the clad material, a Ni tab for conductive connection with the outside of the battery was welded using ultrasonic waves to an end of the Cu foil, and the thus obtained member was used in battery assembly.

Meanwhile, a positive electrode was fabricated as follows. A slurry in which 97 parts by mass of lithium cobalt oxide, 1.5 parts by mass of acetylene black functioning as a conduction supporting agent, and 1.5 parts by mass of PVDF functioning as a binder dispersed in NMP was prepared and applied to one face of an Al foil having a thickness of 12 µm, and was dried thereon, after which, pressure treatment was performed so that a positive electrode material mixture layer having a mass of approximately 23 mg/cm$^2$ was formed on one face of the Al foil current collector. Note that the positive electrode material mixture layer was not formed on a portion of the slurry application face, so that the Al foil at that position was exposed. Then, the Al foil current collector was cut into a piece having a size of 20 mm×45 mm, and an Al tab for conductive connection with the outside of the battery was welded using ultrasonic waves to the position where the Al foil was exposed, so that a positive electrode was fabricated in which a positive electrode material mixture layer having a size of 20 mm×30 mm was formed on one face of the current collector.

The positive electrode was laminated on both sides of the negative electrode precursor to which the Ni tab was welded, respectively via separators each made of a PE microporous film having a thickness of 16 μm, so that a set of electrode bodies was fabricated. Furthermore, a non-aqueous electrolyte was prepared by dissolving $LiBF_4$ at a concentration of 1 m/mol in a mixed solvent containing propylene carbonate (PC) and methyl ethyl carbonate (MEC) in a volume ratio of 1:2. The electrode body was dried in a vacuum at 60° C. for 15 hours, and was then encapsulated in a laminated film outer packaging together with the non-aqueous electrolyte, and thus a non-aqueous electrolyte battery having a rated capacity of 30 mAh, the appearance shown in FIG. 2, and a cross-sectional structure shown in FIG. 3 was fabricated.

Figure 2:
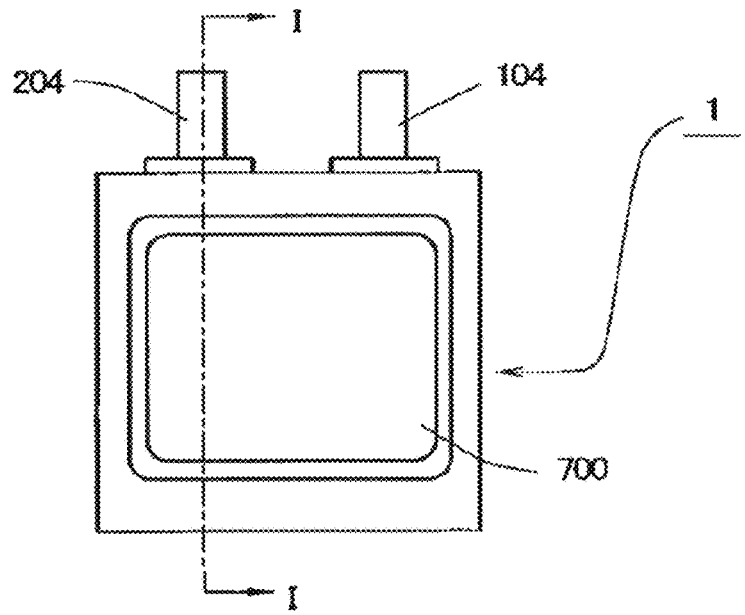
FIG. 2 is a plan view schematically showing an example of a non-aqueous electrolyte battery of the present invention.
Figure 3:
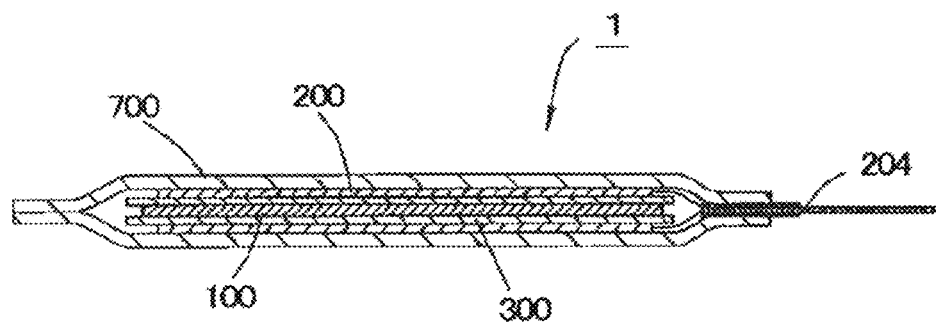
FIG. 3 is a cross-sectional view taken along line I-I in FIG. 2.

Below, FIGS. 2 and 3 will be described. FIG. 2 is a plan view schematically showing a non-aqueous electrolyte battery, and FIG. 3 is a cross-sectional view taken along line I-I in FIG. 2. A non-aqueous electrolyte battery 1 is configured such that a laminated film outer packaging 700 made of two laminated films accommodates a laminated electrode body in which positive electrodes 200 and a negative electrode 100 are laminated with separators 300 interposed therebetween, and a non-aqueous electrolyte (not shown), and the laminated film outer packaging 700 is sealed at the outer periphery thereof by heat-sealing the upper and lower laminated films. In FIG. 3, in order to avoid complicated drawings, the layers constituting the laminated film outer packaging 700 and the layers of the positive electrodes 200 and the negative electrode 100 are not shown in a distinguished manner.

The positive electrodes 200 are connected via electrical leads to a positive electrode external terminal 204 in the battery 1. Although not shown, the negative electrode 100 is also connected via an electrical lead to a negative electrode external terminal 104 in the battery 1. One end of the positive electrode external terminal 204 and one end of the negative electrode external terminal 104 extend to the outside of the laminated film outer packaging 700 so as to be connectable to an external device or the like.

Example 2

A non-aqueous electrolyte battery having a rated capacity of 30 mAh was fabricated likewise to Example 1, except that, as a negative electrode precursor, a clad material (laminated metal foil) having a size of 25 mm×40 mm was used in which Al foils each having a thickness of 30 μm were respectively laminated on both faces of a Ni foil having a thickness of 30 μm (tensile strength: 490 N/mm², volume resistivity: $6.8×10^{-6}$ Ω·cm).

Comparative Example 1

As a negative electrode precursor, a clad material (laminated metal foil) having a size of 25 mm×40 mm was used in which an Al foil having a thickness of 30 μm was laminated on one face of a Cu foil having a thickness of 30 μm. A Cu foil for collecting a current was welded using ultrasonic waves to an end of the clad material, a Ni tab for conductive connection with the outside of the battery was welded using ultrasonic waves to an end of the Cu foil, and the thus obtained part was used for battery assembly.

Meanwhile, a positive electrode was fabricated as follows. A slurry similar to that in Example 1 was applied to both faces of an Al foil having a thickness of 12 μm, and was dried thereon, after which pressure treatment was performed so that positive electrode material mixture layers each having a mass of approximately 23 mg/cm² were respectively formed on both faces of the Al foil current collector. Note that the positive electrode material mixture layer was not formed on portions of the Al foil on both faces, so that the Al foil at those positions was exposed. Then, the Al foil current collector was cut into a piece having a size of 20 mm×45 mm, and an Al tab for conductive connection with the outside of the battery was welded using ultrasonic waves to the positions where the Al foil was exposed, so that a positive electrode was fabricated in which positive electrode material mixture layers each having a size of 20 mm×30 mm were respectively formed on both faces of the current collector.

The negative electrode was laminated on both sides of the positive electrode respectively via separators each made of a PE microporous filter having a thickness of 16 μm, so that a set of electrode bodies was fabricated. Subsequently, a non-aqueous electrolyte battery having a rated capacity of 30 mAh was fabricated likewise to Example 1.

The batteries of Examples 1 and 2 and Comparative Example 1 were allowed to stand for 24 hours after the assembly, and were then evaluated in terms of the following items.

Flatness of Negative Electrode

The batteries of Examples 1 and 2 and Comparative Example 1 were charged at a constant current (6 mA) and a constant voltage (4.0 V), and charging was ended when the charging current decreased to 0.3 mA where the batteries were in a fully charged state. Then, each battery was disassembled in argon gas and the negative electrode was extracted, and the deformation level was visually checked. In all negative electrodes, a Li—Al alloy was formed at a portion, of the Al foil forming the clad material, that faced the positive electrode material mixture layer, and the portion at the periphery that did not face the positive electrode material mixture layer did not react with Li, and remained in an Al state.

Furthermore, when the battery charge was completed, the Li content was 31 at % when the total of Li and Al in the Al active layer of the negative electrode was taken as 100 at %.

Figure 4:
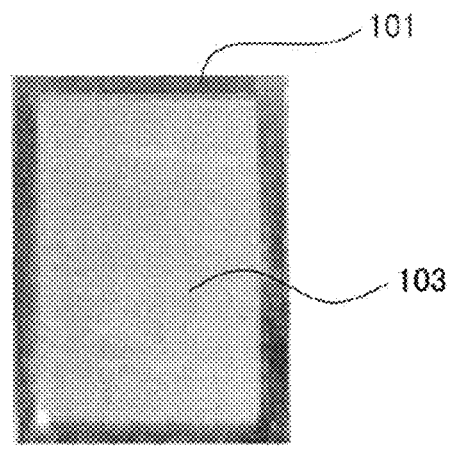
FIG. 4 is a photograph of a negative electrode extracted from a non-aqueous electrolyte battery of Example 1 after charge.
Figure 5:
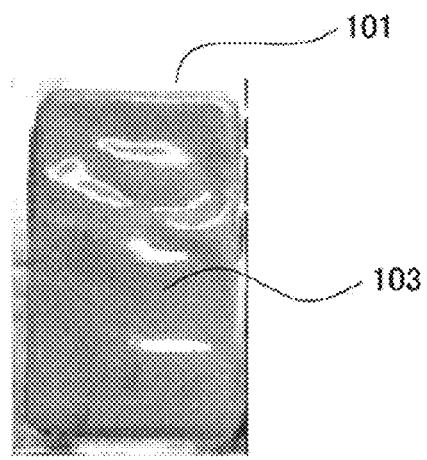
FIG. 5 is a photograph of a negative electrode extracted from a non-aqueous electrolyte battery of Comparative Example 1 after charge.

FIGS. 4 and 5 show photographs of the negative electrodes extracted from the non-aqueous electrolyte batteries of Example 1 and Comparative Example 1, respectively. In the batter of Example 1, the negative electrode was kept substantially flat as clearly seen from FIG. 4 although it was slightly curved due to formation of a Li—Al alloy in an Al active layer 103. In the battery of Example 2 in which the strength of the base layer of the negative electrode was made to be higher than that in Example 1, a superior flatness was maintained although not shown. On the other hand, in the battery of Comparative Example 1, the negative electrode was significantly curved due to formation of a Li—Al alloy in the Al active layer 103 as seen from FIG. 5.

High-Temperature Storage Characteristics

The batteries of Examples 1 and 2 and Comparative Example 1 were charged at a constant current (6 mA) and a constant voltage (4.0 V), and charging was ended when the charging current decreased to 0.3 mA. Then, the batteries were discharged at a constant current of 6 mA (discharge end voltage: 2 V), and the discharge capacity (initial discharge capacity) was measured. The batteries were further charged in the above-described charge conditions so as to be in a fully charged state. All batteries had an initial discharge capacity of 30 mAh.

After the batteries in a fay charged state were stored at 85° C. for 10 days and were then cooled down to room temperature, the batteries were discharged at a constant current of 30 mA (discharge end voltage: 2 V). Furthermore, the batteries were charged in the above-described charge conditions and discharged at 30 mA (discharge end voltage: 2 V), and the discharge capacity (recovery capacity) after storage at a high temperature was measured. The high-temperature storage characteristics of the batteries were evaluated based on a ratio of the recovery capacity with respect to the initial discharge capacity.

Charge/Discharge Cycle Characteristics

The batteries of Examples 1 and 2 and Comparative Example 1 were charged at a constant current (15 mA) and a constant voltage (4.0 V) (note that the charge was ended when the charging current decreased to 1.5 mA) and discharged at a current of 30 mA for 24 minutes (discharge capacity: 12 mAh), and such charge/discharge cycles were repeated. The charge/discharge cycle characteristics of the batteries were evaluated based on the number of cycles reached when the battery voltage at the end of the discharge was lower than 2 V.

Table 1 shows the evaluation results of the batteries. In Table 1, "Negative electrode flatness" is such that "Excellent" refers to a case in which a negative electrode was not substantially deformed and was kept flat, "Good" refers to a case in which a negative electrode was slightly deformed but was kept substantially flat, and "Poor" refers to a case in which a negative electrode was significantly curved and was not kept flat.

TABLE 1

|  | Negative electrode flatness | Initial discharge capacity (mAh) | High-temperature storage characteristics (%) | Charge/discharge cycle characteristics (times) |
| --- | --- | --- | --- | --- |
| Ex. 1 | Good | 30 | 99 | 98 |
| Ex. 2 | Excellent | 30 | 105 | 120 |
| Com. Ex. 1 | Poor | 30 | 54 | 50 |

As shown in Table 1, even when the non-aqueous electrolyte batteries of Examples 1 and 2 having a negative electrode constituted by a laminated body including a metal base layer that does not form an alloy with Li, and Al active layers respectively bonded to both faces of the metal base layer (Al active layers in which Li—Al alloys were formed on the surface sides thereof) were charged, the flatness of the negative electrode was satisfactorily maintained, the recovery capacity ratio after the storage at high temperature was high, i.e., the high-temperature storage characteristics were excellent, and the number of cycles when the charge/discharge cycle characteristics were evaluated was relatively large, i.e., repeated charge was possible. In the batteries of the examples, the area (total area) of the Al active layers was as large as about 20 cm$^2$, and thus the strength of the metal base layer had a greater influence on the battery characteristics, and the battery of Example 2 was superior to the battery of Example 1 in terms of high-temperature storage characteristics and charge/discharge cycle characteristics.

On the other hand, in the battery of Comparative Example 1 having a negative electrode constituted by a laminated body in which an Al active layer was bonded to only one face of the metal base layer, the negative electrode was not kept flat after charge, the high-temperature storage characteristics were poor, and the number of cycles when the charge/discharge cycle characteristics were evaluated was small.

Comparative Example 2

A Li foil having a thickness of 50 μm was laminated on a surface of an Al layer of a clad material (laminated metal foil) in which an Al foil having a thickness of 100 μm was laminated on one face of a Cu foil having a thickness of 30 μm, and the obtained material was punched into a circular piece, so that a laminated body for a negative electrode was obtained.

Meanwhile, a positive electrode was fabricated as follows. A slurry in which 97 parts by mass of lithium cobalt oxide, 1.5 parts by mass of acetylene black functioning as a conduction supporting agent, and 1.5 parts by mass of PVDF functioning as a binder dispersed in NMP was prepared and applied to one face of an Al foil having a thickness of 30 μm, and was dried thereon, after which pressure treatment was performed, and the obtained material was punched into a circular piece, so that a positive electrode was fabricated. The thickness of the positive electrode material mixture layer of the obtained positive electrode was 130 μm.

Figure 6:
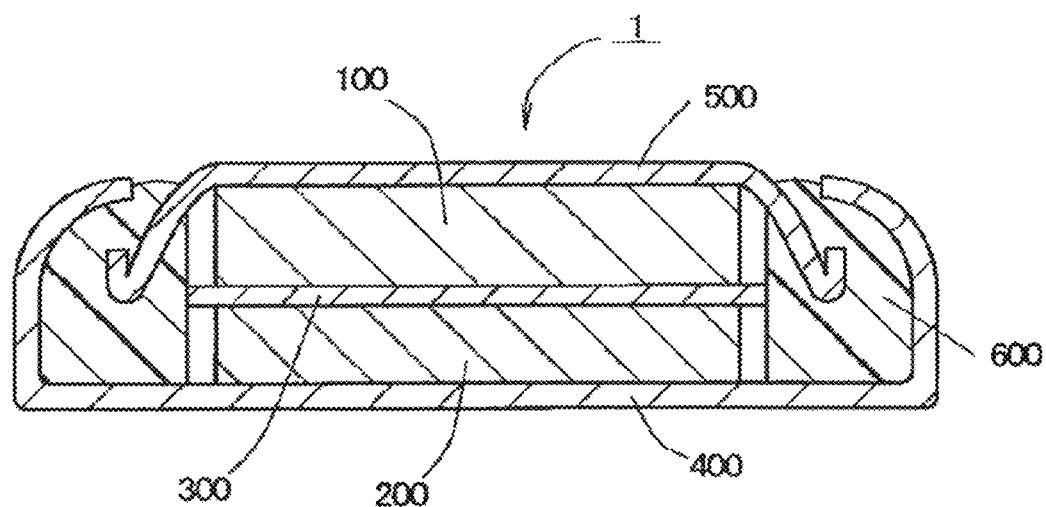
FIG. 6 is a vertical cross-sectional view schematically showing another example of a non-aqueous electrolyte battery of the present invention.

The laminated body for the negative electrode and the positive electrode were laminated with a separator (PE microporous membrane having a thickness of 16 μm) interposed therebetween, and the laminated body was encapsulated in a battery container together with the non-aqueous electrolyte (solution prepared by dissolving LiBF$_4$ at a concentration of 1.0 mol/l in a mixed solvent containing PC and DMC in a volume ratio of 1:2), and thus a 2016 coin cell (non-aqueous electrolyte battery) having the structure shown in FIG. 6 was fabricated.

FIG. 6 will be described below. FIG. 6 is a vertical cross-sectional view schematically showing a non-aqueous electrolyte battery (coin cell) of Comparative Example 2. In the non-aqueous electrolyte battery 1, the positive electrode 200 was accommodated inside a positive electrode can 400. The negative electrode precursor (the laminated body for the negative electrode) 100 was disposed via the separator 300 on the positive electrode 200. Furthermore, the negative electrode precursor 100 was in contact with the inner face of a negative electrode can 500. In FIG. 6, the layers of the negative electrode precursor (the laminated body for the negative electrode) 100 and the layers (the positive electrode material mixture layer and the current collector) of the positive electrode 200 are not shown in a distinguished manner. Furthermore, a non-aqueous electrolyte (not shown) was injected into the battery 1.

In the non-aqueous electrolyte battery 1, the positive electrode can 400 also function as a positive electrode terminal, and the negative electrode can 500 also function as a negative electrode terminal. The opening of the positive electrode can 400 was sealed by clamping the opening end of the positive electrode can 400 inward, thereby pressing a ring-like resin packing 600 arranged at the circumferential edge of the negative electrode can 500, so that the resin packing 600 was pressed against the circumferential edge of the negative electrode can 500 and the inner circumferential face of the opening end of the positive electrode can 400. That is to say the non-aqueous electrolyte battery 1 was sealed by the resin packing 600 that was interposed between the positive electrode terminal (the positive electrode can 400) and the negative electrode terminal (the negative electrode can 500).

Note that the non-aqueous electrolyte coin battery of Comparative Example 2 is an example having a negative electrode constituted by a laminated body including a clad material having an Al metal layer only on one face of the metal base layer, and a Li foil laminated on a surface of the Al metal layer, and is also an example in which the metal base layer according to the negative electrode is made of a material having a low tensile strength. However, the aspect (2) of the non-aqueous electrolyte battery in which the metal base layer according to the negative electrode is made of a material having a high tensile strength (a metal selected from Ni Ti, and Fe, or an alloy thereof) also has the structure shown in FIG. 2.

Comparative Example 3

A2016 coin cell was fabricated likewise to Comparative Example 2, except that a Li foil having a thickness of 50 µm was laminated on one face of an Al foil having a thickness of 100 µm, the obtained material was punched into a circular piece, and the punched piece was laminated on a circular Cu foil having a thickness of 30 µm, so that a laminated body for a negative electrode was obtained.

The coin cells of Comparative Examples 2 and 3 were charged at a constant current (0.36 mA) and a constant voltage (3.9 V) until the charging current decreased to 0.036 mA, and the initial charge efficiency was obtained.

Furthermore, after the coin cells of Comparative Examples 2 and 3 were charged in the above-described conditions, the batteries were allowed to stand at −40° C. After the temperature of the batteries decreased, the batteries were discharged at a discharging current of 10 mA, so that the discharging characteristics at −40° C. were evaluated.

Furthermore, after the coin cells of Comparative Examples 2 and 3 were charged in the above-described conditions, the batteries were stored at 85° C. for 40 days. The internal resistances of the batteries after storage were measured, and thus the high-temperature storage characteristics were evaluated.

Figure 7:
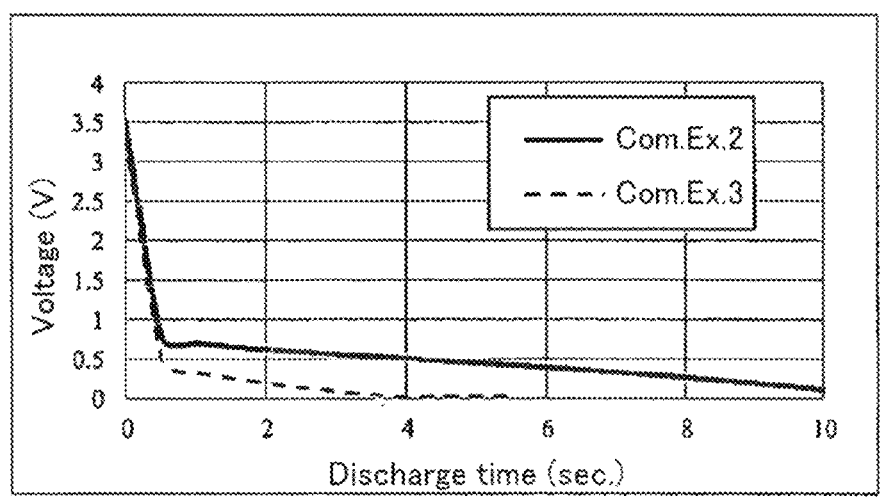
FIG. 7 is a graph showing discharging characteristics at −40° C. of non-aqueous electrolyte batteries of Comparative Examples 2 and 3.

Table 2 and FIG. 7 show the evaluation results.

TABLE 2

|  | Initial charge efficiency (%) | Internal resistance after high-temperature storage (Ω) |
|---|---|---|
| Com. Ex. 2 | 92 | 14.5 |
| Com. Ex. 3 | 88 | 18.2 |

As shown in Table 2, the coin cell of Comparative Example 2 having a negative electrode in which an Al active layer derived from an Al foil and a Li foil, and a metal base layer made of a Cu foil bonded to each other had a higher initial charge efficiency and superior reversibility, lower internal resistance after storage at high temperature, and superior storage characteristics, compared with the coin cell of Comparative Example 3 having a negative electrode in which an Al active layer and a metal base layer were not bonded to each other.

Furthermore, as shown in FIG. 7, the coin cell of Comparative Example 2 was a non-aqueous electrolyte battery having a higher voltage in discharge at −40° C., a longer discharge time, and superior operation characteristics even at low temperature, compared with the coin cell of Comparative Example 3.

In the win cell of Comparative Example 2, the area of the Al active layer of the negative electrode was small, and thus the characteristics were good to some extent in spite of using the clad material having an Al metal layer only on one face of a metal base layer (Cu foil) having a relatively low strength.

Evaluation of Non-Aqueous Electrolyte Battery System

Example 3

The non-aqueous electrolyte battery of Example 1 and a charging/discharging apparatus were combined to form a non-aqueous electrolyte battery system.

Comparative Example 4

An electrode body was fabricated likewise to Example 1, except that the thickness of the Al foil in the dad material of Example 1 was 10 µm, and a non-aqueous electrolyte battery was fabricated likewise to Example 1, except that this electrode body was used.

The non-aqueous electrolyte battery and a charging/discharging apparatus were combined to form a non-aqueous electrolyte battery system.

Comparative Example 5

An electrode body was fabricated likewise to Example 1, except that the thickness of the Al foil in the clad material of Example 1 was 100 µm, and a non-aqueous electrolyte battery was fabricated likewise to Example 1, except that this electrode body was used.

The non-aqueous electrolyte battery and a charging/discharging apparatus were combined to form a non-aqueous electrolyte battery system.

The batteries forming the non-aqueous electrolyte battery systems of Example 3 and Comparative Examples 4 and 5 were charged at a constant, current (6 mA) and a constant voltage (4.0 V), the charge being ended when the charging current decreased to 0.3 mA, and discharged at a constant current of 6 mA (discharge end voltage: 2.0 V), and such charge/discharge cycles were performed for three cycles. The Li content after charging and the discharge capacity were measured. Table 3 shows the results.

TABLE 3

|  | Li content at end of charge (at %) | Discharge capacity in $1^{st}$ cycle (mAh) | Discharge capacity in $2^{nd}$ cycle (mAh) | Discharge capacity in $3^{rd}$ cycle (mAh) |
|---|---|---|---|---|
| Ex. 3 | 31 | 30 | 31 | 31 |
| Com. Ex. 4 | 51 | 33 | 14 | 8 |
| Com. Ex. 5 | 9 | 25 | 25 | 24 |

In Table 3, "Li content at end of charging" refers to the Li content when the total of Li and Al was taken as 100 at %, and shows a value in the charge in the $1^{st}$ cycle.

In the non-aqueous electrolyte battery system of Example 3, also in the $2^{nd}$ and subsequent cycles, the Li content when the total of Li and Al in the negative electrode after charge was taken as 100 at % was a value substantially similar to that in the $1^{st}$ cycle, and was in the range of 15 to 48 at %, and thus the discharge capacity was substantially constant and stable, that is, it was possible to form a battery system that can be subjected to charge/discharge cycles for some number of times.

On the other hand, in the non-aqueous electrolyte battery system of Comparative Example 4, the Li content in the negative electrode after charging in the $1^{st}$ cycle was more than 48 at %, and the capacity significantly decreased in accordance with cycles. Furthermore, in the non-aqueous electrolyte battery system of Comparative Example 5, the Li content in the negative electrode after charging was less than 15 at % also in the 2$^{nd}$ and subsequent cycles, and the discharge capacity was lower than that in Example 3.

The invention may be embodied in other forms without departing from the gist thereof. The embodiments disclosed in this application are to be considered in all respects as illustrative and not limiting. The scope of the present invention should be construed in view of the appended claims, rather than the foregoing description, and all changes that come within the meaning and range of equivalency of the claims are intended to be embraced therein.

INDUSTRIAL APPLICABILITY

The non-aqueous electrolyte battery of the present invention can be repeatedly charged and has good storage characteristics in a high-temperature environment. Thus, using such characteristics, this battery can be preferably used in applications, such as power sources of vehicle emergency reporting systems, in which the capacity is required to be well maintained for a long period of time in a high-temperature environment.

DESCRIPTION OF REFERENCE NUMERALS

1 Non-aqueous electrolyte battery
100 Negative electrode, negative electrode precursor (laminated body for negative electrode)
101 Laminated metal foil
101a Metal base layer
101b Al metal layer
102 Li foil
103 Al active layer
200 Positive electrode
300 Separator
400 Positive electrode can
500 Negative electrode can
600 Resin packing
700 Laminated film outer packaging

The invention claimed is:

1. A non-aqueous electrolyte battery comprising an electrode body in which a positive electrode and a negative electrode are laminated with a separator interposed therebetween, and a non-aqueous electrolyte,
   wherein the negative electrode has a laminated body including a metal base layer that does not form an alloy with Li, and Al active layers respectively bonded to both faces of the metal base layer,
   Li—Al alloys are formed at least on surface sides of the Al active layers, and
   a Li content is 3 to 48 at % when a total of and Al in the Al active layer is taken as 100 at %.

2. The non-aqueous electrolyte battery according to claim 1, wherein the metal base layer that does not form an alloy with Li is made of a metal selected from the group consisting of Cu, Ni, Ti, Fe, and an alloy thereof.

3. The non-aqueous electrolyte battery according to claim 1, wherein the metal base layer is made of a material having a volume resistivity of $80 \times 10^{-6}$ Ω·cm or less.

4. The non-aqueous electrolyte battery according to claim 1, wherein the Al active layers have an area of 10 cm$^2$ or more.

5. The non-aqueous electrolyte battery according to claim 1, wherein the metal base layer has a thickness of 10 to 50 μm.

6. The non-aqueous electrolyte battery according to claim 1, wherein the positive electrode contains a lithium-containing composite oxide as a positive electrode active material.

7. A non-aqueous electrolyte battery comprising an electrode body in which a positive electrode and a negative electrode are laminated with a separator interposed therebetween, and a non-aqueous electrolyte,
   wherein the negative electrode has a laminated body including a metal base layer that does not form an alloy with Li, and an Al active layer bonded to the metal base layer,
   a Li—Al alloy is formed at least on a surface side of the Al active layer,
   the metal base layer is made of a metal selected from the group consisting of Ni, Ti, Fe, and an alloy thereof and
   a Li content 3 to 48 at % when a total of Li and Al in the Al active layer is taken as 100 at %.

8. An non-aqueous electrolyte battery system comprising the non-aqueous electrolyte battery according to claim 1, and a charging circuit,
   wherein the Li content is 15 to 40 at %.

9. An non-aqueous electrolyte battery system comprising the non-aqueous electrolyte battery according to claim 7, and a charging circuit,
   wherein the Li content is 15 to 40 at %.

10. An non-aqueous electrolyte battery system comprising the non-aqueous electrolyte battery according to claim 1, and a charging circuit,
    wherein the Li content is 15 to 35 at %.

11. An non-aqueous electrolyte battery system comprising the non-aqueous electrolyte battery according to claim 7, and a charging circuit,
    wherein the Li content is 15 to 35 at %.

* * * * *